United States Patent
Mukkavilli et al.

(10) Patent No.: US 11,516,058 B2
(45) Date of Patent: Nov. 29, 2022

(54) PEAK TO AVERAGE POWER RATIO SHAPING TECHNIQUES

(71) Applicant: QUALCOMM Incorporated, San Diego, CA (US)

(72) Inventors: Krishna Kiran Mukkavilli, San Diego, CA (US); June Namgoong, San Diego, CA (US); Taesang Yoo, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/199,788

(22) Filed: Mar. 12, 2021

(65) Prior Publication Data

US 2021/0288854 A1 Sep. 16, 2021

Related U.S. Application Data

(60) Provisional application No. 62/989,532, filed on Mar. 13, 2020.

(51) Int. Cl.
*H04L 27/26* (2006.01)
*H04W 76/27* (2018.01)
*H04W 72/04* (2009.01)

(52) U.S. Cl.
CPC ....... *H04L 27/2618* (2013.01); *H04W 72/042* (2013.01); *H04W 76/27* (2018.02)

(58) Field of Classification Search
CPC .. H04L 27/2618; H04W 76/27; H04W 72/042
See application file for complete search history.

(56) References Cited

U.S. PATENT DOCUMENTS

| 6,674,810 | B1* | 1/2004 | Cheng | H04L 27/2618 |
| 2004/0156264 | A1* | 8/2004 | Gardner | E21B 47/13 |

FOREIGN PATENT DOCUMENTS

| EP | 3447982 A1 | 2/2019 |
| WO | WO-2018014969 A1 | 1/2018 |

OTHER PUBLICATIONS

Gao L., et al., "Joint Optimization of Subcarriers Allocation and Tone Reservation PAPR Reduction for OFDMA Systems", Communication Technology (ICCT), 2012 IEEE 14th International Conference on, IEEE, Nov. 9, 2012 (Nov. 9, 2012), pp. 1172-1176, XP032390428, DOI: 10.1109/ICCT.2012.6511374 ISBN: 978-1-4673-2100-6 Section III.

(Continued)

*Primary Examiner* — Ronald B Abelson
(74) *Attorney, Agent, or Firm* — Norton Rose Fulbright US LLP

(57) ABSTRACT

Systems and methods providing peak to average power ratio (PAPR) shaping for PAPR reduction using, for example, an extra-allocation peak reduction tone (PRT) signal processing technique are described. Carrier resources outside of carrier resources allocated for data transmission may be utilized for extra-allocation PRTs. Use of extra-allocation carrier resources for transmitting extra-allocation PRTs may be subject to a power threshold (T). The extra-allocation carrier resources and/or extra-allocation PRTs may be configured for peak to average power shaping of signal transmissions by a wireless device, such as base stations, user equipments (UEs), etc. Other aspects and features are also claimed and described.

28 Claims, 7 Drawing Sheets

(56) References Cited

OTHER PUBLICATIONS

International Search Report and Written Opinion—PCT/US2021/022252—ISA/EPO—dated Jun. 8, 2021.
Jun Y., et al., "Reduction of the Peak-to-Average Power Ratio of the Multicarrier Signal via Artificial Signals", 2000 International Conference on Communication Technology Proceedings: Aug. 21-25, 2000, Beijing, China, [Part of] WCC 2000, [16th World Computer Congress 2000], Piscataway, NJ, USA,IEEE, us, vol. 1, Aug. 21, 2000 (Aug. 21, 2000), pp. 581-585, XP010526815, ISBN: 978-0-7803-6394-6 Section 2. figure 1.
ETSI EN 302 755, V1.4.1, "Digital Video Broadcasting (DVB); Frame structure channel coding and modulation for a second generation digital terrestrial, television broadcasting system (DVB-T2)," 2015, 193 pages.
Gatherer A., et al., "Controlling Clipping Probability in DMT Transmission," Proc. 31st Asilomar Conference on Signals, Systems, and Computers, 1998, pp. 578-584.
Tellado J., et al., "Peak power reduction for multicarrier transmission," IEEE Globecom, 1998, 6 pages.
U.S. Appl. No. 17/154,215, filed Aug. 26, 2021, Namgoong; June, et al.

\* cited by examiner

PEAK TO AVERAGE POWER RATIO SHAPING TECHNIQUES

CROSS-REFERENCE TO RELATED APPLICATIONS

The present application claims the benefit of U.S. Provisional Patent Application No. 62/989,532, entitled "PEAK TO AVERAGE POWER RATIO SHAPING USING EXTRA-ALLOCATION PEAK REDUCTION TONES," filed Mar. 13, 2020 and is related to co-pending and commonly assigned U.S. patent application Ser. No. 17/154,215, filed Jan. 21, 2021, and 62/980,776, filed Feb. 24, 2020, each of which is entitled "MACHINE LEARNING BASED RECEIVER PERFORMANCE IMPROVEMENT USING PEAK REDUCTION TONES," the disclosures of all of which are hereby incorporated by reference herein in their entirety as if fully set forth below and for all applicable purposes.

TECHNICAL FIELD

Aspects of the present disclosure relate generally to wireless communication systems, and more particularly, to peak to average power ratio shaping techniques for wireless communications. Certain aspects and/or embodiments of the technology discussed below can enable and provide peak to average power ratio shaping using carrier resources outside of carrier resources allocated for data transmission, or extra-allocation carrier resources, for peak reduction tones configured for peak to average power shaping of signal transmissions.

INTRODUCTION

Wireless communication networks are widely deployed to provide various communication services such as voice, video, packet data, messaging, broadcast, and the like. These wireless networks may be multiple-access networks capable of supporting communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Signal distortion caused by processing of signals for transmission, such as by signal amplification provided by a power amplifier (PA), may also degrade performance on both the downlink and uplink. For example, some signal waveforms suffer from large peak to average power ratio (PAPR) which can result in high peaks causing a PA to operate in the nonlinear region. PA operation in the nonlinear region leads to signal distortion and spectral spreading of the signal.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include transmitting a signal via a wireless communication link using at least a portion of carrier resources allocated for data transmission in the wireless communication link. The method may further include transmitting one or more extra-allocation peak reduction tones (PRTs), configured to provide peak to average power ratio (PAPR) shaping with respect to the signal, using carrier resources of extra-allocation carrier resources outside of the carrier resources allocated for data transmission in the wireless communication link based on a power threshold (7) established with respect to the extra-allocation PRTs.

In an additional aspect of the disclosure, a method of wireless communication is provided. The method may include identifying extra-allocation carrier resources outside of carrier resources allocated for data transmission in a wireless communication link. The method may also include transmitting a time domain signal via the wireless communication link using at least a portion of the carrier resources allocated for data transmission. The method may further include transmitting one or more extra-allocation PRTs using carrier resources of the extra-allocation carrier resources. The transmitting the extra-allocation PRTs may be in accordance with a power threshold (T) established with respect to the extra-allocation PRTs. The one or more extra-allocation PRTs may be configured to provide PAPR shaping with respect to the time domain signal.

In an additional aspect of the disclosure, an apparatus configured for wireless communication is provided. The apparatus may include means for transmitting a signal via a wireless communication link using at least a portion of carrier resources allocated for data transmission in the wireless communication link. The apparatus may also include means for transmitting one or more extra-allocation PRTs, configured to provide PAPR shaping with respect to the signal, using carrier resources of extra-allocation carrier resources outside of the carrier resources allocated for data transmission in the wireless communication link based on a power threshold (T) established with respect to the extra-allocation PRTs.

In an additional aspect of the disclosure, an apparatus configured for wireless communication is provided. The apparatus may include means for identifying extra-allocation carrier resources outside of carrier resources allocated for data transmission in a wireless communication link. The apparatus may also include means for transmitting a time domain signal via the wireless communication link using at least a portion of the carrier resources allocated for data transmission. The apparatus may further include means for transmitting one or more extra-allocation PRTs using carrier resources of the extra-allocation carrier resources. The transmitting the extra-allocation PRTs may be in accordance with a power threshold (T) established with respect to the extra-allocation PRTs. The one or more extra-allocation PRTs may be configured to PAPR shaping with respect to the time domain signal.

In an additional aspect of the disclosure, a non-transitory computer-readable medium having program code recorded thereon for providing wireless communication is provided. The program code may include code to transmit a signal via a wireless communication link using at least a portion of carrier resources allocated for data transmission in the wireless communication link. The program code may also include code to transmit one or more extra-allocation PRTs, configured to provide PAPR shaping with respect to the signal, using carrier resources of extra-allocation carrier resources outside of the carrier resources allocated for data transmission in the wireless communication link based on a power threshold (T) established with respect to the extra-allocation PRTs.

In an additional aspect of the disclosure, a non-transitory computer-readable medium having program code recorded thereon for providing wireless communication is provided. The program code may include code to identify extra-allocation carrier resources outside of carrier resources allocated for data transmission in a wireless communication link. The program code may also include code to transmit a time domain signal via the wireless communication link using at least a portion of the carrier resources allocated for data transmission. The program code may further include code to transmit one or more extra-allocation PRTs using carrier resources of the extra-allocation carrier resources. The transmitting the extra-allocation PRTs may be in accordance with a power threshold (T) established with respect to the extra-allocation PRTs. The one or more extra-allocation PRTs may be configured to provide PAPR shaping with respect to the time domain signal.

In an additional aspect of the disclosure, an apparatus configured for wireless communication is disclosed. The apparatus includes at least one processor, and a memory coupled to the processor. The processor may be configured to transmit a signal via a wireless communication link using at least a portion of carrier resources allocated for data transmission in the wireless communication link. The processor may also be configured to transmit one or more extra-allocation PRTs, configured to provide PAPR shaping with respect to the signal, using carrier resources of extra-allocation carrier resources outside of the carrier resources allocated for data transmission in the wireless communication link based on a power threshold (T) established with respect to the extra-allocation PRTs.

In an additional aspect of the disclosure, an apparatus configured for wireless communication is disclosed. The apparatus includes at least one processor, and a memory coupled to the processor. The processor may be configured to identify extra-allocation carrier resources outside of carrier resources allocated for data transmission in a wireless communication link. The processor may also be configured to transmit a time domain signal via the wireless communication link using at least a portion of the carrier resources allocated for data transmission. The processor may further be configured to transmit one or more extra-allocation PRTs using carrier resources of the extra-allocation carrier resources. The transmitting the extra-allocation PRTs may be in accordance with a power threshold (T) established with respect to the extra-allocation PRTs. The one or more extra-allocation PRTs may be configured to provide PAPR shaping with respect to the time domain signal.

In accordance with aspects of the disclosure, the foregoing systems, methods, and apparatuses may be implemented in combination with one or more additional features, such as the following features whether alone or in combination. For example, the above systems, methods, and apparatuses may include the extra-allocation carrier resources in a bandwidth available for allocation of carrier resources for the data transmission in the wireless communication link. The above systems, methods, and apparatuses may include the extra-allocation carrier resources spanning the bandwidth available for allocation of carrier resources for the data transmission. The above systems, methods, and apparatuses may include the extra-allocation carrier resources defining one or more sub-bands of the bandwidth available for allocation of carrier resources for the data transmission. The above systems, methods, and apparatuses may include the extra-allocation carrier resources comprising carrier resources that are contiguous with carrier resources allocated for the data transmission. The above systems, methods, and apparatuses may include the extra-allocation carrier resources not being contiguous with carrier resources allocated for the data transmission. The above systems, methods, and apparatuses may include a mapping of the extra-allocation resources for the transmitting one or more extra-allocation PRTs being fixed per wireless device transmitting one or more extra-allocation PRTs. The above systems, methods, and apparatuses may include a mapping of the extra-allocation resources for the transmitting one or more extra-allocation PRTs being dynamically adjustable. The above systems, methods, and apparatuses may include controlling interference introduced by the transmitting the extra-allocation PRTs using the power threshold, T. The above systems, methods, and apparatuses may include the power threshold, T, comprising a power limit for each extra-allocation PRT of the extra-allocation PRTs. The above systems, methods, and apparatuses may include the power threshold, T, comprising a power limit for total power in each sub-band of the extra-allocation carrier resources. The above systems, methods, and apparatuses may include the power threshold, T, comprising a power limit sum total of power in the extra-allocation carrier resources. The above systems, methods, and apparatuses may include a value of the power threshold, T, being based on network loading. The above systems, methods, and apparatuses may include a value of the power threshold, T, being based on the extra-allocation carrier resources being restricted to one or more sub-bands of the bandwidth available for allocation of carrier resources for the data transmission. The above systems, methods, and apparatuses may include a value of the power threshold, T, utilized by a particular wireless device in association with the transmitting one or more extra-allocation PRTs being based on at least one of an amount of interference, communication link path loss, or an operating parameter of the wireless device. The above systems, methods, and apparatuses may include different values of the power threshold, T, being utilized by different wireless devices operating in a wireless network. The above systems, methods, and apparatuses may include the extra-allocation carrier resources and the power threshold, T, being signaled to a wireless device that performs the identifying and the transmitting. The above systems, methods, and apparatuses may include the extra-allocation carrier resources and the power threshold, T, being signaled to the wireless device through radio resource control (RRC) signaling. The above systems, methods, and apparatuses may include downlink control information (DCI) being used to indicate that the wireless device is to operate in an extra-allocation PRT PAPR shaping mode for a given grant and transmission.

In one aspect of the disclosure, a method of wireless communication is provided. The method may include allocating carrier resources for data transmission to a plurality of UEs. The method may also include transmitting a common set of extra-allocation carrier resources comprising carrier resources outside of the carrier resources allocated to the plurality of UEs to the plurality of UEs via wireless communications. The common set of extra-allocation carrier resources may be configured for use by the plurality of UEs in their transmitting one or more extra-allocation PRTs using carrier resources of the extra-allocation carrier resources in association with their transmitting a signal using at least a portion of the carrier resources allocated for data transmission.

In an additional aspect of the disclosure, a method of wireless communication is provided. The method may include analyzing carrier resources allocated for data transmission to a plurality of user equipments (UEs) for carrier resources available for use as extra-allocation carrier resources. The method may also include identifying a common set of extra-allocation carrier resources outside of the carrier resources allocated to the plurality of UEs. The common set of extra-allocation carrier resources may be configured for use by the plurality of UEs in their transmitting one or more extra-allocation PRTs using carrier resources of the extra-allocation carrier resources in association with their transmitting a time domain signal using at least a portion of the carrier resources allocated for data transmission. The method may further include transmitting the common set of extra-allocation carrier resources to the plurality of UEs via a wireless communication link.

In an additional aspect of the disclosure, an apparatus configured for wireless communication is provided. The apparatus may include means for allocating carrier resources for data transmission to a plurality of UEs. The apparatus may also include means for transmitting a common set of extra-allocation carrier resources comprising carrier resources outside of the carrier resources allocated to the plurality of UEs to the plurality of UEs via wireless communications. The common set of extra-allocation carrier resources may be configured for use by the plurality of UEs in their transmitting one or more extra-allocation PRTs using carrier resources of the extra-allocation carrier resources in association with their transmitting a signal using at least a portion of the carrier resources allocated for data transmission.

In an additional aspect of the disclosure, an apparatus configured for wireless communication is provided. The apparatus may include means for analyzing carrier resources allocated for data transmission to a plurality of UEs for carrier resources available for use as extra-allocation carrier resources. The apparatus may also include means for identifying a common set of extra-allocation carrier resources outside of the carrier resources allocated to the plurality of UEs. The common set of extra-allocation carrier resources may be configured for use by the plurality of UEs in their transmitting one or more extra-allocation PRTs using carrier resources of the extra-allocation carrier resources in association with their transmitting a time domain signal using at least a portion of the carrier resources allocated for data transmission. The apparatus may further include means for transmitting the common set of extra-allocation carrier resources to the plurality of UEs via a wireless communication link.

In an additional aspect of the disclosure, a non-transitory computer-readable medium having program code recorded thereon for wireless communication is provided. The program code may include code to allocate carrier resources for data transmission to a plurality of UEs. The program code may also include code to transmit a common set of extra-allocation carrier resources comprising carrier resources outside of the carrier resources allocated to the plurality of UEs to the plurality of UEs via wireless communications. The common set of extra-allocation carrier resources may be configured for use by the plurality of UEs in their transmitting one or more extra-allocation PRTs using carrier resources of the extra-allocation carrier resources in association with their transmitting a signal using at least a portion of the carrier resources allocated for data transmission.

In an additional aspect of the disclosure, a non-transitory computer-readable medium having program code recorded thereon for wireless communication is provided. The program code may include code to analyze carrier resources allocated for data transmission to a plurality of UEs for carrier resources available for use as extra-allocation carrier resources. The program code may also include code to identify a common set of extra-allocation carrier resources outside of the carrier resources allocated to the plurality of UEs. The common set of extra-allocation carrier resources may be configured for use by the plurality of UEs in their transmitting one or more extra-allocation PRTs using carrier resources of the extra-allocation carrier resources in association with their transmitting a time domain signal using at least a portion of the carrier resources allocated for data transmission. The program code may further include code to transmit the common set of extra-allocation carrier resources to the plurality of UEs via a wireless communication link.

In an additional aspect of the disclosure, an apparatus configured for wireless communication is disclosed. The apparatus includes at least one processor, and a memory coupled to the processor. The processor may be configured to allocate carrier resources for data transmission to a plurality of UEs. The processor may also be configured to transmit a common set of extra-allocation carrier resources comprising carrier resources outside of the carrier resources allocated to the plurality of UEs to the plurality of UEs via wireless communications. The common set of extra-allocation carrier resources may be configured for use by the plurality of UEs in their transmitting one or more extra-allocation PRTs using carrier resources of the extra-allocation carrier resources in association with their transmitting a signal using at least a portion of the carrier resources allocated for data transmission.

In an additional aspect of the disclosure, an apparatus configured for wireless communication is disclosed. The apparatus includes at least one processor, and a memory coupled to the processor. The processor may be configured to analyze carrier resources allocated for data transmission to a plurality of UEs for carrier resources available for use as extra-allocation carrier resources. The processor may also be configured to identify a common set of extra-allocation carrier resources outside of the carrier resources allocated to the plurality of UEs. The common set of extra-allocation carrier resources may be configured for use by the plurality of UEs in their transmitting one or more extra-allocation PRTs using carrier resources of the extra-allocation carrier resources in association with their transmitting a time domain signal using at least a portion of the carrier resources allocated for data transmission. The processor may further be configured to transmit the common set of extra-allocation carrier resources to the plurality of UEs via a wireless communication link.

In accordance with aspects of the disclosure, the foregoing systems, methods, and apparatuses may be implemented in combination with one or more additional features, such as the following features whether alone or in combination. For example, the above systems, methods, and apparatuses may include transmitting the common set of extra-allocation carrier resources by broadcasting the common set of extra-allocation carrier resources to the plurality of UEs using a broadcast channel. The above systems, methods, and apparatuses may include transmitting the common set of extra-allocation carrier resources by transmitting the common set of extra-allocation carrier resources to the plurality of UEs using RRC signaling. The above systems, methods, and apparatuses may include DCI being used to indicate that the wireless device is to operate in an extra-allocation PRT PAPR shaping mode for a given grant and transmission. The above systems, methods, and apparatuses may include the common set of extra-allocation carrier resources being in a bandwidth available for allocation of carrier resources for data transmission by the plurality of UEs in the wireless communication link. The above systems, methods, and apparatuses may include the common set of extra-allocation carrier resources defining one or more sub-bands of the bandwidth available for allocation of carrier resources for the data transmission. The above systems, methods, and apparatuses may include the common set of extra-allocation carrier resources comprising carrier resources that are contiguous with carrier resources allocated for the data transmission. The above systems, methods, and apparatuses may include the common set of extra-allocation carrier resources not being contiguous with carrier resources allocated for the data transmission. The above systems, methods, and apparatuses may include a mapping of the extra-allocation resources for the transmitting one or more extra-allocation PRTs being dynamically adjustable. The above systems, methods, and apparatuses may include selecting one or more power thresholds (T) for use with respect to the common set of extra-allocation carrier resource configuration, wherein transmitting the common set of extra-allocation carrier resources includes transmitting the one or more power thresholds. The above systems, methods, and apparatuses may include a power threshold, T, of the one or more power thresholds comprising a power limit for each extra-allocation PRT of the extra-allocation PRTs. The above systems, methods, and apparatuses may include a power threshold, T, of the one or more power thresholds comprising a power limit for total power in each sub-band of the extra-allocation carrier resources. The above systems, methods, and apparatuses may include a power threshold, T, of the one or more power thresholds comprising a power limit sum total of power in the extra-allocation carrier resources. The above systems, methods, and apparatuses may include a value of the one or more power thresholds being based on network loading. The above systems, methods, and apparatuses may include a value of the one or more power thresholds being based on the extra-allocation carrier resources being restricted to one or more sub-bands of the bandwidth available for allocation of carrier resources for the data transmission. The above systems, methods, and apparatuses may include a value of the one or more power thresholds being utilized by a particular wireless device in association with the transmitting one or more extra-allocation PRTs being based on at least one of an amount of interference, communication link path loss, or an operating parameter of the wireless device. The above systems, methods, and apparatuses may include different power thresholds of the one or more power thresholds being utilized by different UEs of the plurality of UEs.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
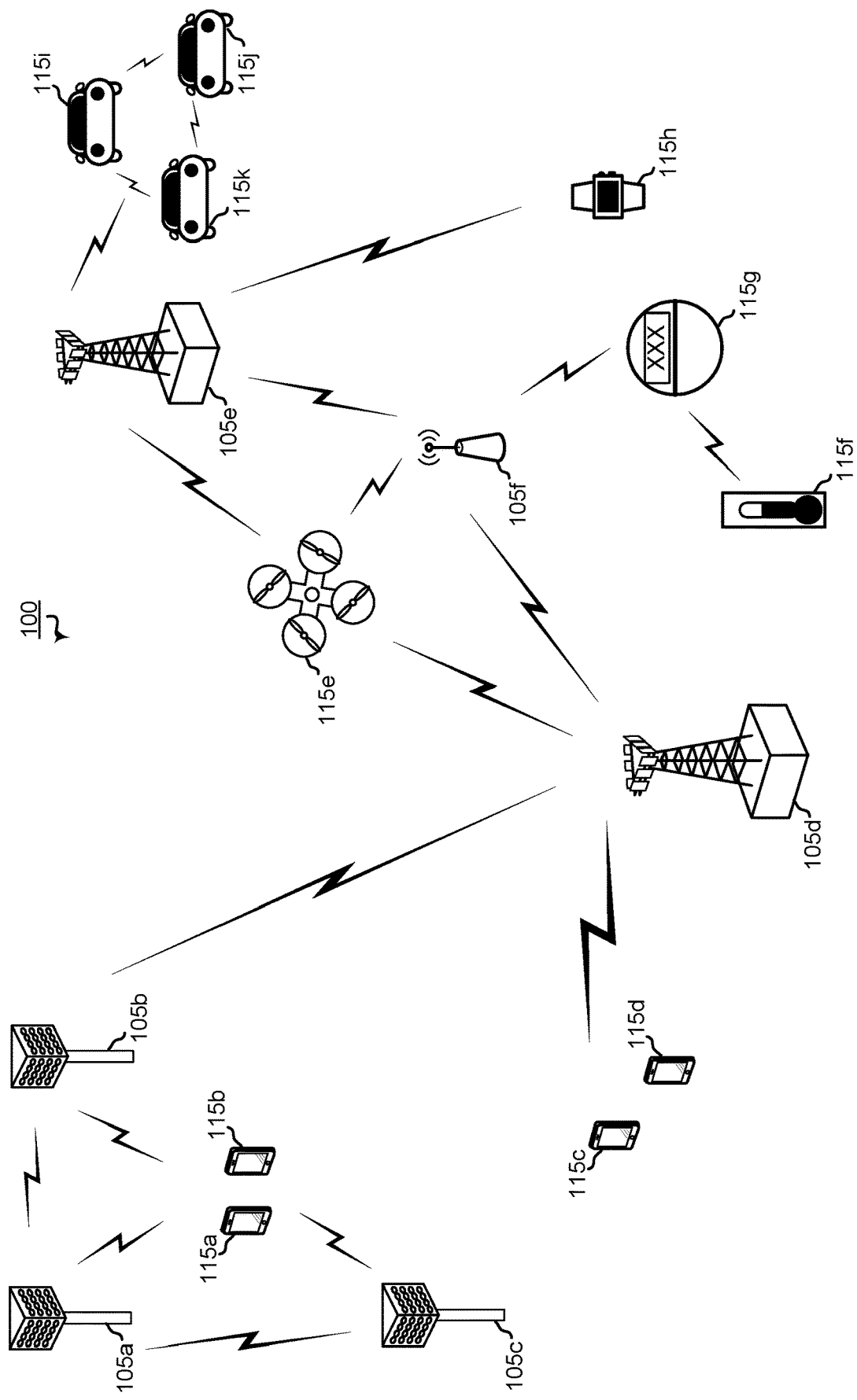
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
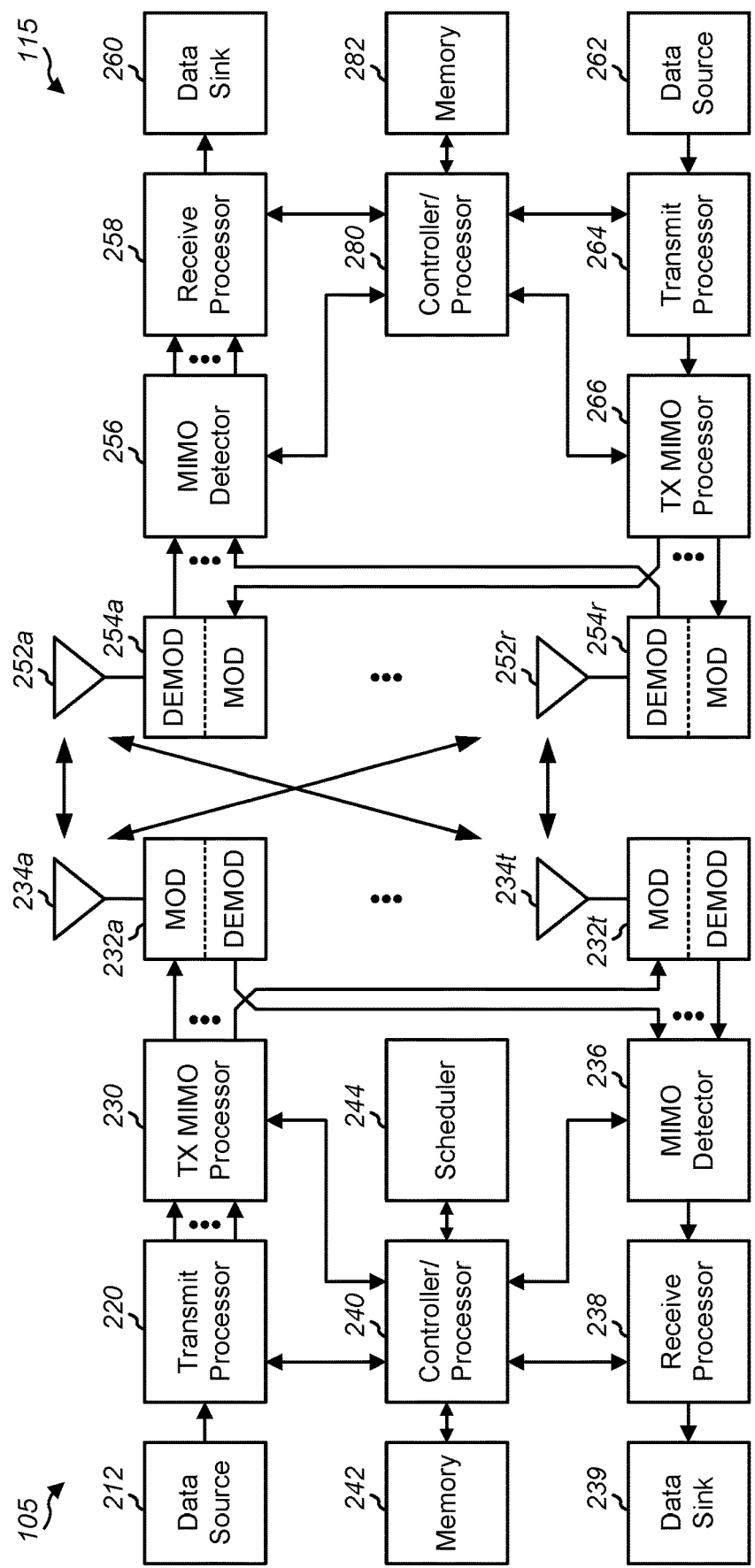
FIG. 2 is a block diagram conceptually illustrating a design of a base station and a user equipment (UE) configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 4A and 4B, and/or other processes for the techniques described herein. Memories 242 and 282 may store data and program codes for base station 105 and UE 115, respectively. Scheduler 244 may schedule UEs for data transmission on the downlink and/or uplink.

Wireless device operations may be impacted by the particular electromagnetic signals processed by the wireless devices. For example, transmit power and power amplifier (PA) efficiency may both be impacted at a wireless device (e.g., base station 105, UE 115, etc.) transmitting a signal. This may be due to peak to average power ratio (PAPR) characteristics of the waveforms employed. The PAPR of the signal waveform is peak amplitude squared (i.e., the peak power) divided by the RMS value squared (i.e., the average power). PAPR generally correlates to the quality of the waveform of a signal being processed for transmission and to the quality of the wireless device emissions.

An OFDM waveform, for example, suffers from relatively large PAPR (e.g., PAPR in the range of 10 dB). Since OFDM signals have a high PAPR, these signals could be clipped in the transmitter PA, because of its limited dynamic range or non-linearity. If a PA is not operated in its linear region, the signal peaks may leak into the non-linear region of the PA causing signal distortion. This signal distortion may introduce inter-modulation among the sub-carriers and out-of-band emission. Accordingly, PA back-off may be utilized to prevent performance degradation and inter-modulation products leaking into adjacent channels. Such PA back-off, however, may come at the cost of the degraded PA efficiency. Even for low modulation coding scheme (MCS) transmissions that are not particularly demanding with respect to signal quality (e.g., do not need high error vector module (EVM)), PA efficiency and transmit power are both limited by the resulting PAPR of the signal waveform. Power available for transmission is further reduced due to the PAPR characteristics of the waveform and the in-band and out of band emissions, adjacent channel leakage power ratio (ACLR) requirements, etc.

Tone reservation is one signal processing technique for providing PAPR reduction. In implementing tone reservation, given a set of data tones of a time domain signal transmitted by a wireless device, a dedicated set of additional tones (referred to as peak reduction tones (PRTs)) orthogonal to the data tones are used by the wireless device to shape the time domain signal. PRTs in time domain may be designed to clip the peaky part of the original waveform so that the peak power is reduced at the cost of the increased average transmit power, if the EVM is maintained for the data tones. The EVM of the data tones can be protected without the receiver wireless device knowing exactly what is transmitted as the PRTs. Accordingly, the PRTs may include a set of additional tones having no relation to the data tones. The PRTs for a given corresponding data signal transmission may be computed by running an iterative algorithm removing peaks by clipping the maximum and the minimum of the signal so that the algorithm converges.

The effectiveness of tone reservation PAPR schemes depends on the number of tones available for PRT resources. There is a tradeoff between overhead from the number of PRT tones and the extent of PAPR reduction. Moreover, the carrier resources for the PRTs are taken from resources allocated for data transmission (e.g., allocated for transmission of user data, control data, etc., or combinations thereof) by the wireless device. For example, in the uplink, carrier resources for the PRTs are taken from the UE data transmission grant. Transmissions, particularly uplink transmissions, are typically band-limited. As an example, in NR networks with 100 MHz channel bandwidth, cell edge UEs may be transmitting an uplink signal over 1-2 MHz bandwidth (e.g., having less than 5 resource blocks (RBs) allocated to the UE in an uplink grant, out of a total of 273 RBs in the channel bandwidth, for the uplink signal transmission), such as due to power constraints. The carrier resources available for the PRTs of a typical tone reservation PAPR scheme can thus be very limited, when restricted to the existing bandwidth allocation.

Embodiments of the present disclosure provide peak to average power ratio shaping for PAPR reduction. Some disclosed aspects include using extra-allocation PRT signal processing techniques. Multiple sets of carrier resources may be utilized, such as first, second, and so on. One or more sets of carrier resources may be carrier resources outside of carrier resources allocated for data transmission, or termed extra-allocation carrier resources.

Extra-allocation carrier resources are utilized for PRTs according to aspects of the disclosure (PRTs utilizing the extra-allocation carrier resources being referred to herein as extra-allocation PRTs). For example, extra-allocation PRTs outside of an allocated grant for a wireless device, although in the bandwidth available for allocation (i.e., still in-band), are thus enabled for peak to average power ratio shaping. The extra-allocation carrier resources and/or extra-allocation PRTs may be configured for peak to average power shaping of signal transmissions by a wireless device, such as a base station 105, a UE 115, etc. Utilization of extra-allocation PRTs according to aspects of the present disclosure may enable improved network coverage (e.g., when uplink link budget limited), new form factors (e.g., smaller PAs due to improved PA efficiency), etc.

Figure 3B:
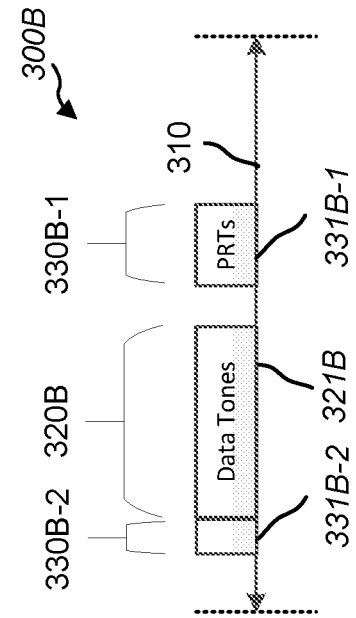
FIGS. 3A-3D show example implementations of extra-allocation carrier resources utilized for providing extra-allocation peak reduction tones (PRTs) configured for peak to average power ratio shaping according to some aspects of the present disclosure.
Figure 3D:
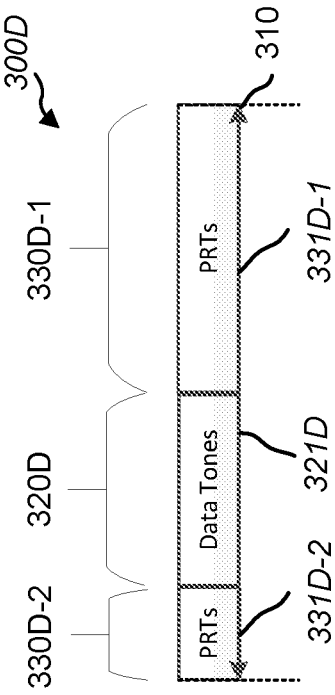
Figure 3A:
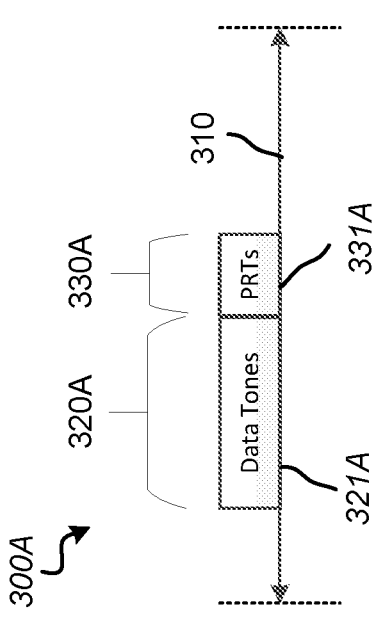

FIGS. 3A-3D show example implementations of extra-allocation carrier resources utilized for providing extra-allocation PRTs configured for peak to average power ratio shaping according to aspects of the present disclosure. FIG. 3A, for example, shows extra-allocation carrier resource configuration 300A implemented with respect to available bandwidth 310. In the illustrated example, allocated carrier resources 320A are carrier resources of available bandwidth 310 allocated for data transmission (e.g., allocated for downlink transmission by a base station to one or more UEs, allocated for uplink transmission by a UE to a base station, etc.). For example, a wireless device may utilize allocated carrier resources 320A for transmission of data tones 321A (e.g., a set of one or more data tones) of a time domain signal transmitted by a wireless device to another wireless device in wireless network 100. Extra-allocation carrier resources 330A are carrier resources of available bandwidth 310 (e.g., an extra-allocation sub-band within the available bandwidth) in which extra-allocation PRTs 331A (e.g., a set of one or more PRTs, outside of the carrier resources allocated for data transmission by the wireless device, configured for peak to average power ratio shaping with respect to data tones 321A) are allowed to be transmitted by the wireless device according to aspects of the present disclosure, such as for PAPR reduction.

Extra-allocation carrier resource configurations are not limited to the example configuration shown in FIG. 3A. For example, extra-allocation carrier resources may not be contiguous with the allocated resources and/or extra-allocation carrier resources may be segmented. FIG. 3B shows extra-allocation carrier resource configuration 300B in which allocated carrier resources 320B are carrier resources of available bandwidth 310 allocated for transmission of data tones 321B. Extra-allocation carrier resources 330B-1 are carrier resources of available bandwidth 310, that are not contiguous with allocated carrier resources 320B (e.g., an extra-allocation sub-band within the available bandwidth which is separated from the carrier resources of allocated carrier resources 320B by some portion of frequency of available bandwidth 310), in which extra-allocation PRTs 331B-1 are allowed to be transmitted by the wireless device. Further, extra-allocation carrier resources 330B-2 (e.g., another extra-allocation sub-band within the available bandwidth) are carrier resources of available bandwidth 310, that are segmented from extra-allocation carrier resources 330B-1 (e.g., multiple extra-allocation sub-bands within the available bandwidth), in which extra-allocation PRTs 331B-2 are allowed to be transmitted by the wireless device. Extra-allocation PRTs 331B-1 and 331B-2 may be configured to cooperatively shape peak to average power ratio with respect to data tones 321B.

Figure 3C:
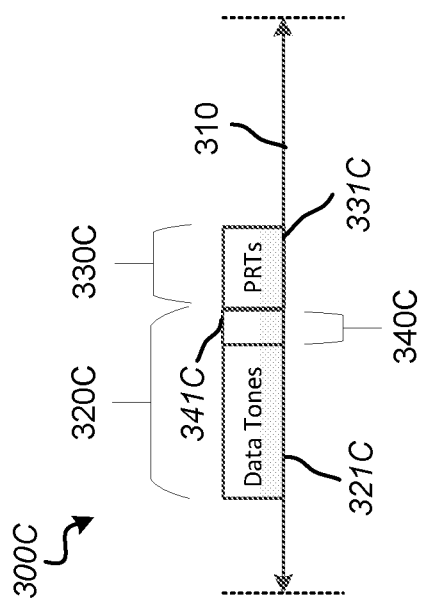

In another example, carrier resources in addition to extra-allocation carrier resources may be utilized for PRTs. FIG. 3C shows extra-allocation carrier resource configuration 300C in which allocated carrier resources 320C are carrier resources of available bandwidth 310 allocated for transmission of data tones 321C. Extra-allocation carrier resources 330C are carrier resources of available bandwidth 310 in which extra-allocation PRTs 331C are allowed to be transmitted by the wireless device. Further, a portion of allocated carrier resources 320C (shown as allocated carrier resources subset 340C) unused in transmission of data tones 321C are carrier resources of available bandwidth 310 in which PRTs 341 are allowed to be transmitted by the wireless device. Extra-allocation PRTs 331C and PRTs 341 may be configured to cooperatively shape peak to average power ratio with respect to data tones 321C.

As still another example, extra-allocation carrier resources may span the entire band of the allocated carrier resources, rather than some subset thereof. FIG. 3D shows extra-allocation carrier resource configuration 300D in which allocated carrier resources 320D are carrier resources of available bandwidth 310 allocated for transmission of data tones 321D. Extra-allocation carrier resources 330D-1 and 330D-2 span the carrier resources of available bandwidth 310 that are not allocated as allocated carrier resources 320D. Accordingly, extra-allocation PRTs 331D-1 and 331D-2 are allowed to be transmitted by the wireless device in any portion of the available bandwidth that is not allocated for transmission of data tones.

In accordance with aspects of the present disclosure, a wireless device may be allowed extra-allocation PRTs so that the wireless device can shape its in-band waveform to result in a lower PAPR waveform using higher degrees of freedom. In accordance with some aspects, any suitable means allowing a wireless device to control the shape of the spectrum may be used with extra-allocation PRTs as described herein. A wireless device may employ any of many PAPR reduction schemes (see e.g., Tellado and Cioffi, "Peak Power Reduction for Multicarrier Transmission", Globecom 1998, Gatherer and Polley, "Controlling Clipping Probability in DMT Transmission", Assilomar 1998, and ETSI EN 302 755 v1.4.1, DVB-T2 PHY spec, the disclosures of which are incorporated herein by reference) when using extra-allocation PRTs as described herein. For example, a mission learning (ML) based tone reservation scheme, such as shown and described in the each of the above referenced patent applications entitled "Machine Learning Based Receiver Performance Improvement Using Peak Reduction Tones", may be utilized in providing peak to average power ratio shaping for PAPR reduction using extra-allocation PRTs of embodiments. Additionally or alternatively, signal processing based PAPR reduction schemes using time domain kernels formed using extra-allocation carrier resources of embodiments may be used.

The increase in carrier resources available for the extra-allocation PRTs (e.g., 273 RBs of the carrier available for PRTs, instead of a fraction of a UE grant of 5 RBs of the carrier) facilitates PAPR scheme effectiveness. For example, the cumulative distribution function (CDF) for PAPR may be shaped more effectively, even for OFDM waveforms, using extra-allocation PRTs according to aspects of the disclosure.

In operation according to some aspects of an extra-allocation PRT signal processing technique one or more particular extra-allocation PRT sub-bands or extra-allocation carrier resources may be identified, assigned, or otherwise designated for use with respect to allocated carrier resources (association of particular extra-allocation PRT sub-bands or extra-allocation carrier resources with corresponding allocated carrier resources being referred to herein as mapping of extra-allocation resources). The mapping of extra-allocation PRT sub-band(s) or extra-allocation carrier resources for corresponding allocated carrier resources may be static or may be dynamically adjusted. For example, extra-allocation carrier resources may be fixed per UE (e.g., remain static throughout communications using the corresponding allocated carrier resources), such as to facilitate optimizing PAPR reduction kernels based on apriori knowledge of the extra-allocation carrier resources. Alternatively, extra-allocation carrier resources may be dynamic for one or more UE (e.g., allowed to change from symbol to symbol, time slot to time slot, etc. of communications using the corresponding allocated carrier resources), such as to provide flexibility for adapting peak to average power ratio shaping for effective PAPR reduction.

The extra-allocation carrier resources of an extra-allocation carrier resource configuration may be selected to achieve various results. For example, extra-allocation carrier resource selection can result in a deterministic interference profile. Selection of extra-allocation carrier resource configurations may be coordinated among wireless devices to help shape the interference profile across the wireless devices, such as for mitigating impact upon the overall performance of the wireless communications. Extra-allocation carrier resource configurations may, for example, be selected to shape the interference allowed by the extra-allocation PRTs. In accordance with some aspects, the shape of the interference allowed by the extra-allocation PRTs may be configured based on various factors. For example, interference allowed by extra-allocation PRTs utilized by one or more wireless device may be shaped based upon the network load, neighbor cells, wireless device communication requirements, and/or other factors.

Wireless devices implementing extra-allocation PRTs may be scheduled, and extra-allocation carrier resources mapped, such that there is no overlap in both the allocated carrier resource sub-bands as well as the extra-allocation carrier resource sub-bands. Additionally or alternatively, wireless devices implementing extra-allocation PRTs may be scheduled, and extra-allocation carrier resources mapped, such that there is overlap in the extra-allocation carrier resource sub-bands.

One or more conditions regarding how much power is allowed with respect to the use of extra-allocation PRTs may be implemented according to embodiments of extra-allocation carrier resource configurations. For example, use of extra-allocation carrier resources for transmitting extra-allocation PRTs by a wireless device may be subject to a power threshold (T). In accordance with aspects of the disclosure, interference in the system resulting from the use of extra-allocation PRTs may be controlled by managing the power threshold, T, implemented by wireless devices transmitting extra-allocation PRTs.

The power threshold, T, may be defined in multiple manners. For example, T may be specified as a power limit for each extra-allocation PRT (e.g., $T_{PRT}$), a power limit for the total power in each extra-allocation carrier resource sub-band instance (e.g., $T_{PRT\text{-}SB}$), a power limit sum total of the power in all extra-allocation carrier resource sub-bands (e.g., $T_{PRT\text{-}Tot}$), etc. For example, the power threshold, T, may be specified as the sum total of all the power the wireless device is allowed to transmit beyond its in-band emission (IBE) limits, or a maximum increase in power (reduction in maximum power reduction (MPR)) allowed with an extra-allocation PRT PAPR waveform. One or more such power threshold (e.g., any combination of $T_{PRT}$, $T_{PRT\text{-}SB}$, and/or $T_{PRT\text{-}Tot}$) may be utilized with respect any particular link between wireless devices of wireless network 100.

The value of a particular power threshold, T, utilized with respect to a wireless device implementing an extra-allocation carrier resource configuration of the present disclosure may be selected based upon a number of considerations (e.g., an amount of interference in the system, communication link path loss, wireless device operating parameters, etc.). In one example, if the network is lightly loaded (e.g., 1-2 users transmitting at each instance in the network), a relatively large value of power threshold, T, (e.g., T may be selected as a value corresponding to a high percentage of the total in-band power, such as a value greater than 50% of the total in-band power) may be used to allow for more aggressive PAPR reduction and improvement in coverage. In another example, if the network is heavily loaded, with a large number of users using up the uplink frequency resources, a relatively low value of power threshold, T, (e.g., T may be selected as a value corresponding to a low percentage of the total in-band power, such as a value less than 50% of the total in-band power, wherein T=0 leads to classical waveform) may be used to minimize interference introduced into the network by transmission of extra-allocation PRTs. In still another example, if the extra-allocation carrier resources of an extra-allocation carrier resource configuration implemented by a wireless device are disposed in (e.g., confined or restricted to) a sub-band (e.g., a sub-band as small as 1 RB or as large or larger than several tens of RBs), a relatively large value of power threshold, T, (e.g., T may be selected as a value corresponding to a high percentage of the total in-band power, such as a value greater than 50% of the total in-band power) may be used to allow for facilitating aggressive PAPR reduction.

In accordance with aspects of the disclosure, different values of power threshold, T, may be used by a particular wireless device implementing an extra-allocation carrier resource configuration. For example, values of power threshold, T, may be selected according to some aspects based upon network loading (e.g., amount of data or traffic being carried by the network), the particular extra-allocation carrier resource configuration and/or extra-allocation carrier resources utilized by the wireless device, the communication path loss, wireless device buffer status, latency and/or service requirements with respect to the data being transmitted by the wireless device, MCS used by the wireless device to transmit the data, wireless device power control parameters, etc. Moreover, different values of power threshold, T, may be used by different wireless devices in the network. For example, different values of power threshold, T, may be selected for use by different wireless devices based upon one or more of the above mentioned considerations for each such different wireless device.

Various signaling may be utilized to configure wireless devices for using extra-allocation PRTs according to aspects of the disclosure. For example, when a UE 115 receives an uplink grant from a corresponding base station 105 the UE may receive information regarding PAPR reduction using extra-allocation PRTs. The information may, for example, indicate whether an extra-allocation carrier resource configuration is enabled or disabled for the uplink transmission. Signaling utilized to configure wireless devices for using extra-allocation PRTs (e.g., the above described signaling) may be provided as dynamic signaling, such as may be carried in one or more control channels. For example, a UE 115 may be configured for PAPR reduction mode and/or for non-PAPR reduction mode by a base station 105 through radio resource control (RRC) signaling, wherein one or more associated parameters may be specified for each mode. The associated parameters may, for example, include extra-allocation carrier resources available for extra-allocation PRTs, one or more power threshold, T (e.g., $T_{PRT}$, $T_{PRT\text{-}SB}$, $T_{PRT\text{-}Tot}$, etc.), and/or other information for facilitating the use of extra-allocation PRTs as described herein. Downlink control information (DCI) may be used to indicate the mode in which the UE is expected to operate for a given uplink grant and transmission.

Figure 4A:
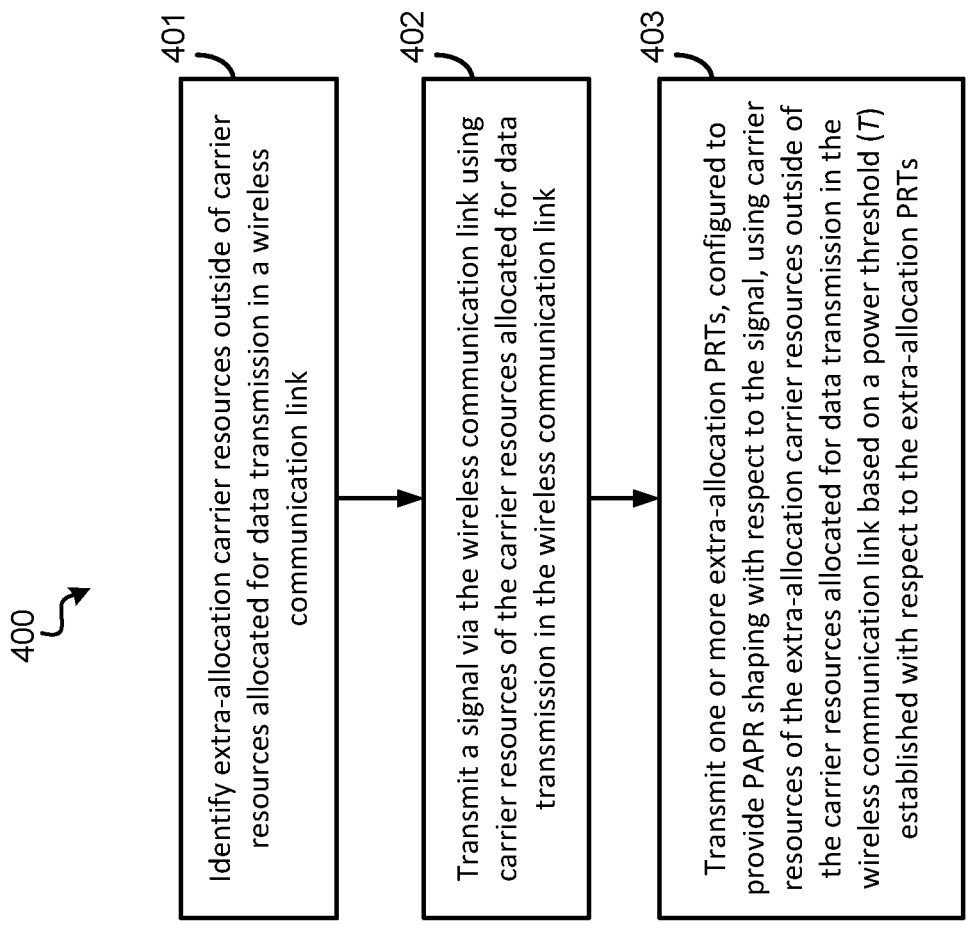
FIG. 4A shows a flow diagram of operation by a wireless communication device implementing an extra-allocation PRT signal processing technique according to some embodiments of the present disclosure.

FIG. 4A shows a flow diagram of operation by a wireless communication device implementing an extra-allocation PRT signal processing technique according to aspects of the present disclosure. The functions of flow 400 of the example shown in FIG. 4A may, for example, be performed by various wireless devices of wireless network 100 (e.g., one or more of base stations 105 and/or UEs 115) for providing extra-allocation PRTs configured for peak to average power ratio shaping according to aspects of the present disclosure.

At block 401 of example flow 400, a wireless device may identify extra-allocation carrier resources (e.g., second carrier resources) outside of carrier resources (e.g., first carrier resources) allocated for data transmission in a wireless communication link. Logic of a base station 105 (e.g., logic provided by an instruction set stored in memory 242 and executed by controller/processor 240) may analyze the bandwidth available for allocation for data transmission and the carrier resources (e.g., the first carrier resources) to be used in the data transmission for carrier resources available for use as extra-allocation carrier resources (e.g., the second carrier resources). For example, logic of the base station may analyze one or more frequency band databases to determine a bandwidth of a frequency band from which carrier resources have been allocated for data transmission by one or more wireless devices to identify bandwidth available for the one or more wireless devices. Carrier resources of the available bandwidth (i.e., bandwidth of the frequency band not otherwise allocated for data transmission by the one or more wireless devices) may be determined to be available for use as extra-allocation carrier resources according to some aspects of the disclosure. The logic of the base station may select the full span of the available carrier resources, or one or more sub-bands of the available carrier resources, as extra-allocation carrier resources, as described above. The logic of the base station may select one or more additional parameters, such as power thresholds, T, for use with respect to one or more extra-allocation carrier resource configuration. In a situation where base station 105 is implementing peak to average power ratio shaping using extra-allocation PRTs, the selected extra-allocation carrier resources may thus be identified by logic of the base station as extra-allocation carrier resources. In a situation where a UE 115 is implementing peak to average power ratio shaping using extra-allocation PRTs, the selected extra-allocation carrier resources may be signaled to the UE by the base station, as described above, and thus the selected extra-allocation carrier resources may be identified by logic of a UE 115 (e.g., logic provided by an instruction set stored in memory 282 and executed by controller/processor 280).

The wireless device may transmit a signal via the wireless communication link using carrier resources of the carrier resources allocated for data transmission in the wireless communication link at block 402 of example flow 400. For example, in a situation where base station 105 is implementing peak to average power ratio shaping using extra-allocation PRTs, the base station may transmit (e.g., using transmit processor 220, TX MIMO processor 230, mods 232a-232t, and antennas 234a-234t operating under control of controller/processor 240) a signal, for which peak to average power ratio shaping is to be provided, as data tones in carrier resources allocated for downlink data transmission to one or more of UEs 115. In a situation where UE 115 is implementing peak to average power ratio shaping using extra-allocation PRTs, the UE may transmit (e.g., using transmit processor 264, TX MIMO processor 266, mods 254a-254r, and antennas 252a-252r operating under control of controller/processor 280) a signal, for which peak to average power ratio shaping is to be provided, as data tones in carrier resources allocated for uplink data transmission to a base station 105. The signals for which peak to average power ratio shaping is to be provided may, for example, comprise time domain signals.

At block 403 of example flow 400, the wireless device may transmit one or more extra-allocation PRTs, configured to provide PAPR shaping with respect to the signal, using carrier resources of the extra-allocation carrier resources outside of the carrier resources allocated for data transmission in the wireless communication link based on a power threshold (T) established with respect to the extra-allocation PRTs. For example, in a situation where base station 105 is implementing peak to average power ratio shaping using extra-allocation PRTs, the base station may transmit (e.g., using transmit processor 220, TX MIMO processor 230, mods 232a-232t, and antennas 234a-234t operating under control of controller/processor 240) extra-allocation PRTs in extra-allocation carrier resources simultaneously with the transmission of the signal in the carrier resources allocated for downlink data transmission. In a situation where UE 115 is implementing peak to average power ratio shaping using extra-allocation PRTs, the UE may transmit (e.g., using transmit processor 264, TX MIMO processor 266, mods 254a-254r, and antennas 252a-252r operating under control of controller/processor 280) extra-allocation PRTs in extra-allocation carrier resources simultaneously with the transmission of the signal in carrier resources allocated for uplink data transmission.

In operation according to embodiments, the transmission of the one or more extra-allocation PRTs is in accordance with a power threshold, T, established with respect to the extra-allocation PRTs. One or more power thresholds, T (e.g., $T_{PRT}$, $T_{PRT-SB}$, $T_{PRT-Tot}$, etc.), may have been determined so as to specify a power limit for each extra-allocation PRT (e.g., $T_{PRT}$), a power limit for the total power in each extra-allocation carrier resource sub-band instance (e.g., $T_{PRT-SB}$), a power limit sum total of the power in all extra-allocation carrier resource sub-bands (e.g., $T_{PRT-Tot}$), etc., as discussed above. In a situation where base station 105 is implementing peak to average power ratio shaping using extra-allocation PRTs, the one or more power thresholds, T, may be identified by logic of the base station for use with respect to the extra-allocation PRTs. In a situation where a UE 115 is implementing peak to average power ratio shaping using extra-allocation PRTs, the one or more power thresholds, T, may be signaled to the UE by the base station, as described above, and thus may be identified by logic of the UE for use with respect to the extra-allocation PRTs.

The one or more extra-allocation PRTs may be configured to provide PAPR shaping with respect to the signal. For example, in a situation where base station 105 is implementing peak to average power ratio shaping using extra-allocation PRTs, logic of the base station (e.g., logic provided by an instruction set stored in memory 242 and executed by controller/processor 240) may implement one or more PAPR reduction schemes to configure particular extra-allocation PRTs for transmission using the extra-allocation carrier resources to realize peak to average power ratio shaping for PAPR reduction of the signal. In a situation where UE 115 is implementing peak to average power ratio shaping using extra-allocation PRTs, logic of the UE (e.g., logic provided by an instruction set stored in memory 282 and executed by controller/processor 280) may implement one or more PAPR reduction schemes to configure particular extra-allocation PRTs for transmission using the extra-allocation carrier resources to realize peak to average power ratio shaping for PAPR reduction of the signal.

In accordance with some aspects of the disclosure, one or more extra-allocation carrier resource configurations may be provided for facilitating the use of extra-allocation PRTs by a plurality of wireless communication devices implementing peak to average power ratio shaping. In one example, a common set of extra-allocation carrier resources are configured (e.g., by a base station 105) for use by a plurality of wireless communication devices (e.g., two or more UEs 115) in their transmission of extra-allocation PRTs providing peak to average power ratio shaping with respect to a respective signal transmission. Such a common extra-allocation carrier resource configuration may, for example, be signaled to the plurality of wireless communication devices using a broadcast channel (e.g., PBCH).

Figure 4B:
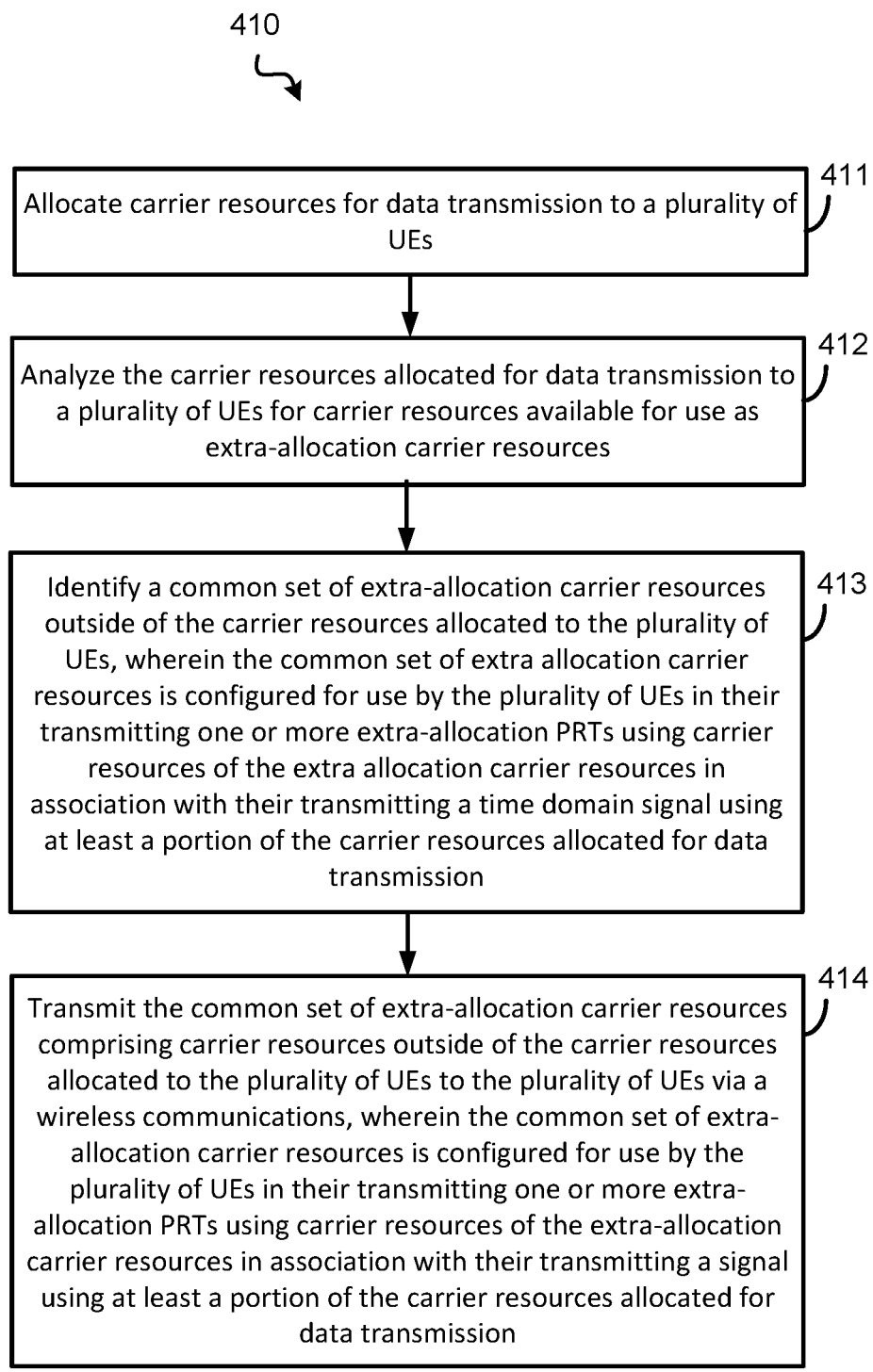
FIG. 4B shows a flow diagram of operation by a wireless communication device implementing extra-allocation carrier resource configuration processing according to some embodiments of the present disclosure.

FIG. 4B shows a flow diagram of operation by a wireless communication device implementing extra-allocation carrier resource configuration processing according to aspects of the present disclosure. The functions of flow 410 of the example shown in FIG. 4B may, for example, be performed by various wireless devices of wireless network 100 (e.g., one or more of base stations 105) for providing extra-allocation carrier resources configured for use in implementing extra-allocation PRTs configured for peak to average power ratio shaping according to aspects of the present disclosure.

At block 411 of example flow 410, a wireless device may allocate carrier resources (e.g., first carrier resources) for data transmission to a plurality of UEs. Logic of a base station 105 (e.g., logic provided by an instruction set stored in memory 242 and executed by controller/processor 240) may analyze one or more frequency band databases to determine a frequency band from which carrier resources are to be allocated for data transmission by one or more wireless devices. Carrier resources of the frequency band may be allocated for data transmission by the one or more UEs of the plurality of UEs.

At block 412 of example flow 410, a wireless device may analyze carrier resources (e.g., the first carrier resources) allocated for data transmission to a plurality of UEs for carrier resources available for use as extra-allocation carrier resources (e.g., second carrier resources). Logic of a base station 105 (e.g., logic provided by an instruction set stored in memory 242 and executed by controller/processor 240) may analyze the bandwidth available for allocation for data transmission and the carrier resources (e.g., the first carrier resources) to be used by two or more UEs in the data transmission for carrier resources available for use as extra-allocation carrier resources (e.g., the second carrier resources). For example, logic of the base station may analyze one or more frequency band databases to determine a bandwidth of a frequency band from which carrier resources have been allocated for data transmission by the plurality of UEs to identify bandwidth available for those UEs. Carrier resources of the available bandwidth (i.e., bandwidth of the frequency band not otherwise allocated for data transmission by the one or more wireless devices) may be determined to be available for use as extra-allocation carrier resources according to some aspects of the disclosure. For example, the logic of the base station may determine the carrier resources in the bandwidth available for allocation that are not assigned (e.g., currently assigned, assigned with respect to a particular symbol/slot, etc.) for data transmission by any UE of the plurality of UEs.

The wireless device may identify a common set of extra-allocation carrier resources outside of the carrier resources allocated to the plurality of UEs at block 413 of flow 410. In accordance with some aspects, the common set of extra-allocation carrier resources may be configured for use by the plurality of UEs in their transmitting one or more extra-allocation PRTs using carrier resources of the extra-allocation carrier resources in association with their transmitting a time domain signal using at least a portion of the carrier resources allocated for data transmission. For example, the logic of the base station may select the full span of the available carrier resources, or one or more sub-bands of the available carrier resources, as extra-allocation carrier resources, as described above. The logic of the base station may select one or more additional parameters, such as power thresholds, T, for use with respect to one or more extra-allocation carrier resource configuration. The selected extra-allocation carrier resources may thus be identified by logic of the base station as a common set of extra-allocation carrier resources for use by the plurality of UEs in peak to average power ratio shaping.

At block 414 of example flow 410, the wireless device may transmit the common set of extra-allocation carrier resources to the plurality of UEs via a wireless communication link. For example, base station 105 may transmit (e.g., using transmit processor 220, TX MIMO processor 230, mods 232a-232t, and antennas 234a-234t operating under control of controller/processor 240) the common set of extra-allocation carrier resources to the plurality of UEs using a broadcast channel (e.g., PBCH). In accordance with some aspects, the common set of extra-allocation carrier resources may be configured for use by the plurality of UEs in their transmitting one or more extra-allocation PRTs using carrier resources of the extra-allocation carrier resources in association with their transmitting a time domain signal using at least a portion of the carrier resources allocated for data transmission. Each UE of the plurality of UEs may utilize extra-allocation carrier resources of the common set of extra-allocation carrier resources for transmitting (e.g., using transmit processor 264, TX MIMO processor 266, mods 254a-254r, and antennas 252a-252r operating under control of controller/processor 280) extra-allocation PRTs simultaneously with their respective transmission of a time domain signal in the carrier resources allocated to that UE for uplink data transmission.

Figure 5:
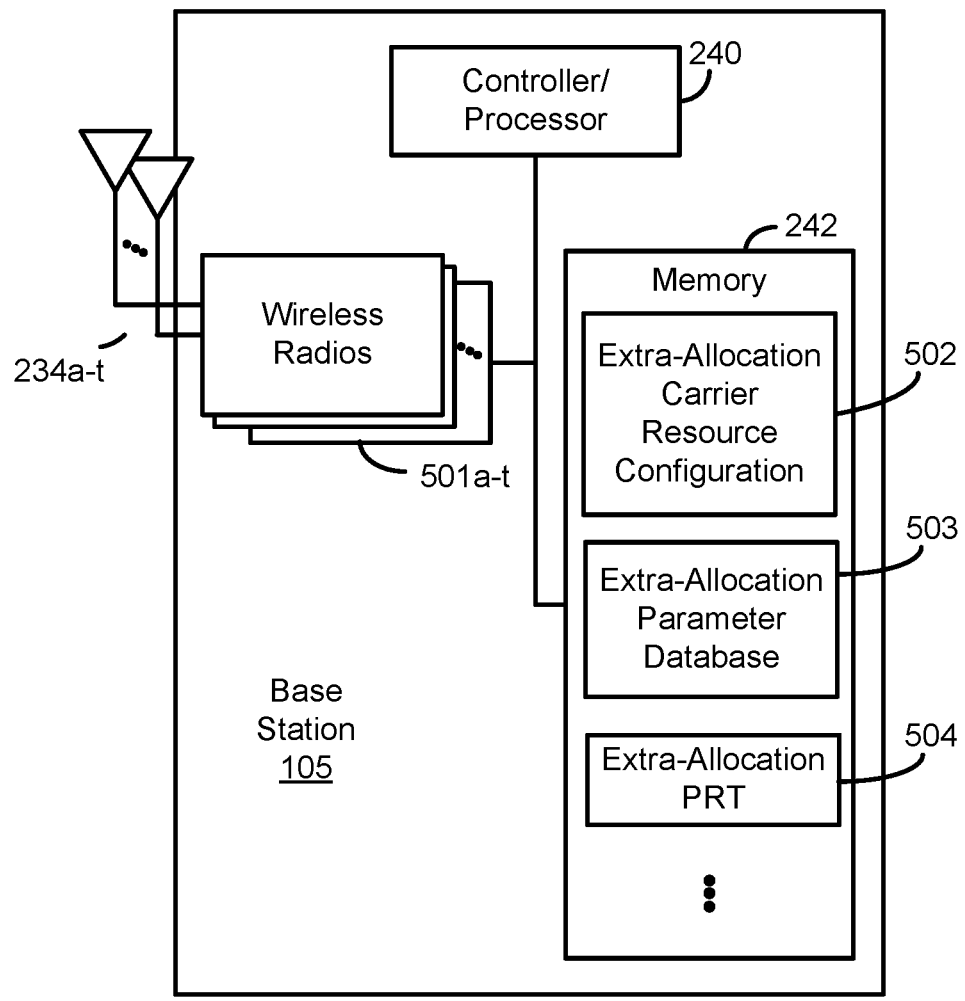
FIG. 5 is a block diagram conceptually illustrating a design of a base station configured to provide extra-allocation PRTs according to some embodiments of the present disclosure.

FIG. 5 is a block diagram illustrating example components of base station 105 configured according to some implementations of the present disclosure. Base station 105, which may be an example of a base station described with reference to FIG. 2, may include controller/processor 240, memory 242, and antennas 234a through 234t, as described above. Base station 105 may also include wireless radios 501a to 501t that include additional components (e.g., transmit processor 220, TX MIMO processor 230, MIMO detector 236, receive processor 238, and/or MODs/DE-MODs 232a-232t) also described above with reference to FIG. 2. Memory 242 of base station 105 stores one or more algorithms (e.g., program code) that configure processor/controller 240 to carry out one or more procedures of a an extra-allocation PRT signal processing technique, such as procedures described above with reference to FIGS. 4A and 4B.

One or more algorithms stored by memory 242 configure processor/controller 240 to carry out one or more operations relating to wireless communication by base station 105, as previously described. For example, extra-allocation carrier resource configuration logic 502 may configure controller processor 240 to carry out operations that include analyzing the bandwidth available for allocation for data transmission and the carrier resources to be used in the data transmission for carrier resources available for use as extra-allocation carrier resources, selecting one or more additional parameters, such as power thresholds, T, for use with respect to one or more extra-allocation carrier resource configuration, etc. in any manner previously described, such as with reference to block 401 of FIG. 4A and/or blocks 411 and 412 of FIG. 4B. Extra-allocation carrier resource configuration parameters may be stored in extra-allocation parameter database 503 by extra-allocation carrier resource configuration logic 502, such as for use by base station 105 and/or UE 115 in implementing an extra-allocation PRT signal processing technique according to aspects of the present disclosure. Additionally, extra-allocation PRT logic 504 may provide one or more extra-allocation carrier resource configurations (e.g., an extra-allocation allocation resource configuration for use by an individual UE, a common set of extra-allocation resources configuration for use by a plurality of UEs, etc.) for transmission to one or more UEs (e.g., via a PBCH, PDCCH, etc.), such as in accordance with operation as described with reference to block 413 of FIG. 4B. In accordance with some aspects, extra-allocation PRT logic 504 (e.g., using one or more parameters from extra-allocation parameter database 503) may configure controller processor 240 to carry out operations that include implementing one or more PAPR reduction schemes, configuring particular extra-allocation PRTs for transmission using the extra-allocation carrier resources, controlling transmission of one or more extra-allocation PRTs using carrier resources of the extra-allocation carrier resources, etc. in any manner previously described, such as with reference to block 403 of FIG. 4A.

Figure 6:
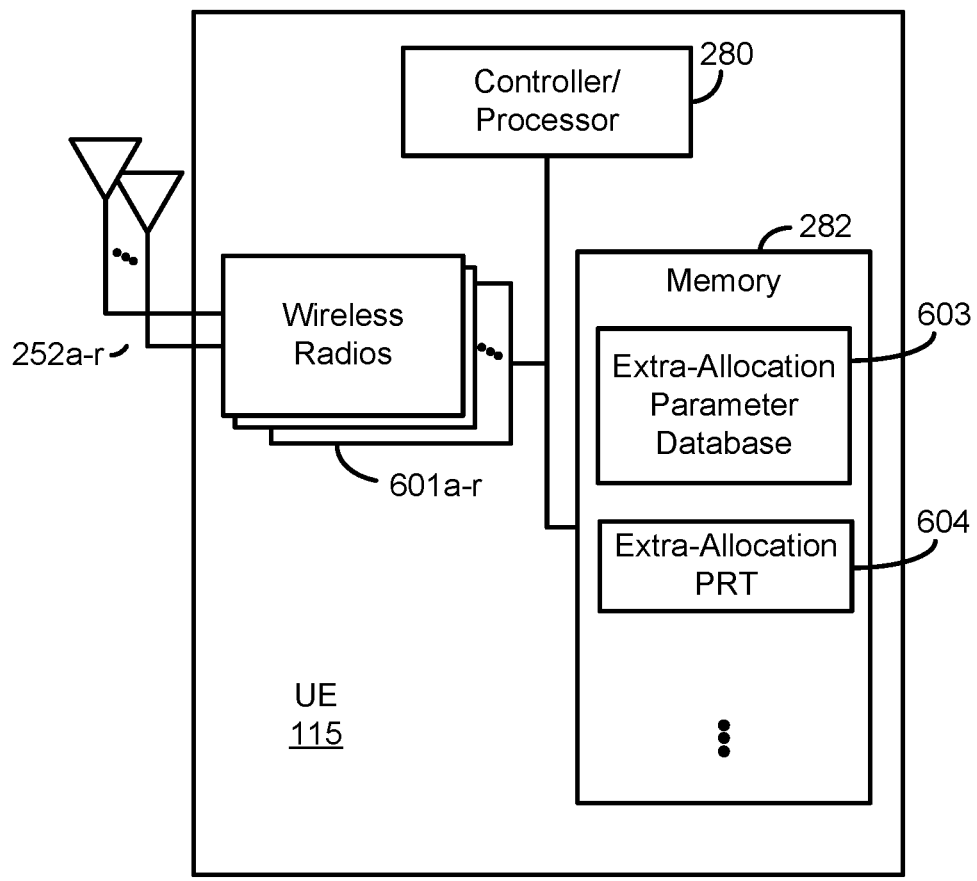
FIG. 6 is a block diagram conceptually illustrating a design of a UE configured to provide extra-allocation PRTs according to some embodiments of the present disclosure.

FIG. 6 is a block diagram illustrating example components of UE 115 configured according to some implementations of the present disclosure. UE 115, which may be an example of a UE 115 described with reference to FIG. 2, may include controller/processor 280, memory 282, and antennas 252a through 252r, as described above. UE 115 may also include wireless radios 601a to 601r that include additional components (e.g., transmit processor 264, TX MIMO processor 266, MIMO detector 256, receive processor 258, and/or MODs/DEMODs 254a-254r), also described above with reference to FIG. 2. Memory 282 of UE 115 stores one or more algorithms (e.g., program code) that configure processor/controller 280 to carry out one or more procedures as described above with reference to FIGS. 4A and 4B.

One or more algorithms stored by the memory 282 configure processor/controller 280 to carry out one or more procedures relating to wireless communication by UE 115, as previously described. For example, extra-allocation carrier resource configuration parameters (e.g., extra-allocation carrier resources, power threshold values, etc.) may be stored in extra-allocation parameter database 603, such as for use by UE 115 in implementing an extra-allocation PRT signal processing technique according to aspects of the present disclosure. UE 115 may, for example, receive various extra-allocation carrier resource configuration parameters via signaling from base station 105, as described above. Extra-allocation PRT logic 604 (e.g., using one or more parameters from extra-allocation parameter database 603) may configure controller processor 280 to carry out operations that include implementing one or more PAPR reduction schemes, configuring particular extra-allocation PRTs for transmission using the extra-allocation carrier resources, controlling transmission of one or more extra-allocation PRTs using carrier resources of the extra-allocation carrier resources, etc. in any manner previously described, such as with reference to block 403 of FIG. 4A.

In some examples of methods, the apparatuses, and articles including non-transitory computer-readable medium described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for transmitting a signal via a wireless communication link using at least a portion of carrier resources allocated for data transmission in the wireless communication link, and transmitting one or more extra-allocation PRTs, configured to provide PAPR shaping with respect to the signal, using carrier resources of extra-allocation carrier resources outside of the carrier resources allocated for data transmission in the wireless communication link based on a power threshold (T) established with respect to the extra-allocation PRTs.

2. The methods, apparatuses, and articles of clause 1, wherein the extra-allocation carrier resources are in a bandwidth available for allocation of carrier resources for the data transmission in the wireless communication link.

3. The methods, apparatuses, and articles of clause 2, wherein the extra-allocation carrier resources span the bandwidth available for allocation of carrier resources for the data transmission.

4. The methods, apparatuses, and articles of clause 2, wherein the extra-allocation carrier resources define one or more sub-bands of the bandwidth available for allocation of carrier resources for the data transmission.

5. The methods, apparatuses, and articles of any of clauses 2-4, wherein the extra-allocation carrier resources comprise carrier resources that are contiguous with carrier resources allocated for the data transmission.

6. The methods, apparatuses, and articles of any of clauses 2-4, wherein the extra-allocation carrier resources are not contiguous with carrier resources allocated for the data transmission.

7. The methods, apparatuses, and articles of any of clauses 1-6, further providing for fixing, per wireless device transmitting one or more extra-allocation PRTs, a mapping of the extra-allocation resources for the transmitting one or more extra-allocation PRTs.

8. The methods, apparatuses, and articles of any of clauses 1-6, further providing for dynamically adjusting a mapping of the extra-allocation resources for the transmitting one or more extra-allocation PRTs.

9. The methods, apparatuses, and articles of any of clauses 1-8, further providing for controlling interference introduced by the transmitting the extra-allocation PRTs using the power threshold, T.

10. The methods, apparatuses, and articles of clause 9, wherein the power threshold, T, comprises a power limit for each extra-allocation PRT of the extra-allocation PRTs.

11. The methods, apparatuses, and articles of any of clauses 9-10, wherein the power threshold, T, comprises a power limit for total power in each sub-band of the extra-allocation carrier resources.

12. The methods, apparatuses, and articles of any of clauses 9-11, wherein the power threshold, T, comprises a power limit defined as a sum total of power in the extra-allocation carrier resources.

13. The methods, apparatuses, and articles of any of clauses 9-12, wherein a value of the power threshold, T, is based on network loading with respect to a network providing the wireless communication link.

14. The methods, apparatuses, and articles of any of clauses 9-13, wherein a value of the power threshold, T, is based on the extra-allocation carrier resources being disposed in one or more sub-bands of the bandwidth available for allocation of carrier resources for the data transmission.

15. The methods, apparatuses, and articles of any of clauses 1-14, wherein a value of the power threshold, T, is based on at least one of an amount of interference, communication link path loss, or an operating parameter of a wireless device transmitting the one or more extra-allocation PRTs.

16. The methods, apparatuses, and articles of any of clauses 1-15, wherein a wireless device transmitting the one or more extra-allocation PRTs utilizes a different value of the power threshold, T, than utilized by different wireless devices operating in a wireless network providing the wireless communication link.

17. The methods, apparatuses, and articles of any of clauses 1-16, wherein the extra-allocation carrier resources and the power threshold, T, are signaled to a wireless device that performs the identifying and the transmitting.

18. The methods, apparatuses, and articles of clause 1-17, further providing for receiving the extra-allocation carrier resources and the power threshold, T, through RRC signaling to a wireless device.

19. The methods, apparatuses, and articles of clause 1-18, further providing for receiving via DCI an indication that the wireless device is to operate in an extra-allocation PRT PAPR shaping mode for a given grant and transmission.

20. Methods, apparatuses, and articles for wireless communication may provide for allocating carrier resources for data transmission to a plurality of UEs, and transmitting a common set of extra-allocation carrier resources comprising carrier resources outside of the carrier resources allocated to the plurality of UEs to the plurality of UEs via wireless communications, wherein the common set of extra-allocation carrier resources is configured for use by the plurality of UEs in their transmitting one or more extra-allocation PRTs using carrier resources of the extra-allocation carrier resources in association with their transmitting a signal using at least a portion of the carrier resources allocated for data transmission.

21. The methods, apparatuses, and articles of clause 20, wherein transmitting the common set of extra-allocation carrier resources uses a broadcast channel.

22. The methods, apparatuses, and articles of clause 20, wherein transmitting the common set of extra-allocation carrier resources uses RRC signaling.

23. The methods, apparatuses, and articles of any of clauses 20-22, further providing for transmitting via DCI an indicating that a UE of the plurality of UEs is to operate in an extra-allocation PRT PAPR shaping mode for a given grant and transmission.

24. The methods, apparatuses, and articles of any of clauses 20-23, wherein the common set of extra-allocation carrier resources are in a bandwidth available for allocation of carrier resources for data transmission by the plurality of UEs in the wireless communication link.

25. The methods, apparatuses, and articles of clause 24, wherein the common set of extra-allocation carrier resources span the bandwidth available for allocation of carrier resources for the data transmission.

26. The methods, apparatuses, and articles of clause 24, wherein the common set of extra-allocation carrier resources define one or more sub-bands of the bandwidth available for allocation of carrier resources for the data transmission.

27. The methods, apparatuses, and articles of any of clauses 24-26, wherein the common set of extra-allocation carrier resources comprise carrier resources that are contiguous with carrier resources allocated for the data transmission.

28. The methods, apparatuses, and articles of any of clauses 24-26, wherein the common set of extra-allocation carrier resources are not contiguous with carrier resources allocated for the data transmission.

29. The methods, apparatuses, and articles of any of clauses 20-28, further providing for dynamically adjusting a mapping of the extra-allocation resources for the transmitting one or more extra-allocation PRTs.

30. The methods, apparatuses, and articles of any of clauses 20-29, further providing for transmitting one or more power thresholds (T) with respect to the common set of extra-allocation carrier resource configuration.

31. The methods, apparatuses, and articles of clause 30, wherein a power threshold, T, of the one or more power thresholds comprises a power limit for each extra-allocation PRT of the extra-allocation PRTs.

32. The methods, apparatuses, and articles of any of clauses 30-31, wherein a power threshold, T, of the one or more power thresholds comprises a power limit for total power in each sub-band of the extra-allocation carrier resources.

33. The methods, apparatuses, and articles of any of clauses 30-32, wherein a power threshold, T, of the one or more power thresholds comprises a power limit defined as a sum total of power in the extra-allocation carrier resources.

34. The methods, apparatuses, and articles of any of clauses 30-33, wherein a value of the one or more power thresholds is based on network loading with respect to a network providing the wireless communications.

35. The methods, apparatuses, and articles of any of clauses 30-34, wherein a value of the one or more power thresholds is based on the extra-allocation carrier resources being disposed in one or more sub-bands of the bandwidth available for allocation of carrier resources for the data transmission.

36. The methods, apparatuses, and articles of any of clauses 30-35, wherein a value of the one or more power thresholds is based on at least one of an amount of interference, communication link path loss, or an operating parameter of a UE of the plurality of UEs.

37. The methods, apparatuses, and articles of any of clauses 30-36, wherein different power thresholds of the one or more power thresholds are utilized by different UEs of the plurality of UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to extra-allocation PRT signal processing techniques may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 4A and 4B) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting a signal via a wireless communication link using at least a portion of carrier resources allocated for data transmission in the wireless communication link; and
   transmitting one or more extra-allocation peak reduction tones (PRTs), configured to provide peak to average power ratio (PAPR) shaping with respect to the signal, using carrier resources of extra-allocation carrier resources outside of the carrier resources allocated for data transmission in the wireless communication link based on a power threshold (T) established with respect to the one or more extra-allocation PRTs, wherein the power threshold (T) comprises one or more of a power limit for each extra-allocation PRT of the one or more extra-allocation PRTs, a power limit for total power in each sub-band of the extra-allocation carrier resources, or a power limit defined as a sum total of power in the extra-allocation carrier resources.

2. The method of claim 1, further comprising:
   fixing, per wireless device transmitting extra-allocation PRTs including a wireless device transmitting the one or more extra-allocation PRTs, a mapping of the extra-allocation carrier resources for the transmitting the extra-allocation PRTs.

3. The method of claim 1, further comprising:
   dynamically adjusting a mapping of the extra-allocation carrier resources for transmitting the one or more extra-allocation PRTs.

4. The method of claim 1, wherein a value of the power threshold (T) is based on network loading with respect to a network providing the wireless communication link.

5. The method of claim 1, wherein a value of the power threshold (T) is based on the extra-allocation carrier resources disposed in one or more sub-bands of bandwidth available for allocation of carrier resources for the data transmission.

6. The method of claim 1, wherein a value of the power threshold (T) is based on at least one of an amount of interference, communication link path loss, or an operating parameter of a wireless device transmitting the one or more extra-allocation PRTs.

7. The method of claim 1, wherein a wireless device transmitting the one or more extra-allocation PRTs utilizes a different value of the power threshold (T) than utilized by different wireless devices operating in a wireless network providing the wireless communication link.

8. The method of claim 1, further comprising:
receiving the extra-allocation carrier resources and the power threshold (T) through radio resource control (RRC) signaling to a wireless device; and
receiving via downlink control information (DCI) an indication that the wireless device is to operate in an extra-allocation PRT PAPR shaping mode for a given grant and transmission.

9. A method of wireless communication, comprising:
allocating carrier resources for data transmission to a plurality of user equipments (UEs); and
transmitting a common set of extra-allocation carrier resources comprising carrier resources outside of the carrier resources allocated to the plurality of UEs to the plurality of UEs via wireless communications, wherein the common set of extra-allocation carrier resources is configured for use by the plurality of UEs in their transmitting one or more extra-allocation peak reduction tones (PRTs) using carrier resources of the extra-allocation carrier resources in association with their transmitting a signal using at least a portion of the carrier resources allocated for data transmission.

10. The method of claim 9, wherein transmitting the common set of extra-allocation carrier resources uses a broadcast channel.

11. The method of claim 9, wherein transmitting the common set of extra-allocation carrier resources uses radio resource control (RRC) signaling.

12. The method of claim 9, further comprising:
transmitting via downlink control information (DCI) an indication that a UE of the plurality of UEs is to operate in an extra-allocation PRT PAPR shaping mode for a given grant and transmission.

13. The method of claim 9, further comprising:
transmitting one or more power thresholds (T) with respect to the common set of extra-allocation carrier resource configuration.

14. The method of claim 13, further comprising:
configuring a power threshold (T) of the one or more power thresholds to comprise one or more of a power limit for each extra-allocation PRT of the one or more extra-allocation PRTs, a power limit for total power in each sub-band of the extra-allocation carrier resources or a power limit defined as a sum total of power in the extra-allocation carrier resources.

15. The method of claim 13, wherein a value of the one or more power thresholds is based on network loading with respect to a network providing the wireless communications.

16. The method of claim 13, wherein a value of the one or more power thresholds is based on the extra-allocation carrier resources disposed in one or more sub-bands of bandwidth available for allocation of carrier resources for the data transmission.

17. The method of claim 13, wherein a value of the one or more power thresholds is based on at least one of an amount of interference, communication link path loss, or an operating parameter of a UE of the plurality of UEs.

18. An apparatus configured for wireless communication, the apparatus comprising:
at least one processor; and
a memory in electrical communication with the at least one processor, the at least one processor configured to cause the apparatus to:
transmit a signal via a wireless communication link using at least a portion of carrier resources allocated for data transmission in the wireless communication link; and
transmit one or more extra-allocation peak reduction tones (PRTs), configured to provide peak to average power ratio (PAPR) shaping with respect to the signal, using carrier resources of extra-allocation carrier resources outside of the carrier resources allocated for data transmission in the wireless communication link based on a power threshold (T) established with respect to the one or more extra-allocation PRTs, wherein the power threshold (T) comprises one or more of a power limit for each extra-allocation PRT of the one or more extra-allocation PRTs, a power limit for total power in each sub-band of the extra-allocation carrier resources, or a power limit defined as a sum total of power in the extra-allocation carrier resources.

19. The apparatus of claim 18, wherein the at least one processor is configured to cause the apparatus to:
fix, per wireless device transmitting extra-allocation PRTs including a wireless device transmitting the one or more extra-allocation PRTs, a mapping of the extra-allocation carrier resources for the transmitting the extra-allocation PRTs.

20. The apparatus of claim 18, wherein the at least one processor is configured to cause the apparatus to:
dynamically adjust a mapping of the extra-allocation carrier resources for transmitting the one or more extra-allocation PRTs.

21. The apparatus of claim 18, wherein a value of the power threshold (T) is based on at least one of network loading, the extra-allocation carrier resources being disposed in one or more sub-bands of bandwidth available for allocation of carrier resources for the data transmission, an amount of interference, communication link path loss, or an operating parameter of a wireless device transmitting the one or more extra-allocation PRTs.

22. The apparatus of claim 18, wherein the extra-allocation carrier resources and the power threshold (T) are received through radio resource control (RRC) signaling, and an indication that a wireless device transmitting the one or more extra-allocation PRTs is to operate in an extra-allocation PRT PAPR shaping mode for a given grant and transmission is received via wherein downlink control information (DCI).

23. An apparatus configured for wireless communication, the apparatus comprising:
at least one processor; and
a memory in electrical communication with the at least one processor, the at least one processor configured to cause the apparatus to:
allocate carrier resources for data transmission to a plurality of user equipments (UEs); and
transmit a common set of extra-allocation carrier resources comprising carrier resources outside of the carrier resources allocated to the plurality of UEs to the plurality of UEs via wireless communications, wherein the common set of extra-allocation carrier resources is configured for use by the plurality of UEs in their transmitting one or more extra-allocation peak reduction tones (PRTs) using carrier resources of the extra-allocation carrier resources in association with their transmitting a signal using at least a portion of the carrier resources allocated for data transmission.

24. The apparatus of claim 23, wherein a broadcast channel is used to transmit the common set of extra-allocation carrier resources to the plurality of UEs.

25. The apparatus of claim 23, wherein radio resource control (RRC) signaling is used to transmit the common set of extra-allocation carrier resources to the plurality of UEs, and wherein downlink control information (DCI) is used to indicate that a UE of the plurality of UEs is to operate in an extra-allocation PRT PAPR shaping mode for a given grant and transmission.

26. The apparatus of claim 23, wherein the at least one processor is configured to cause the apparatus to:
    transmit one or more power thresholds (T) with respect to the common set of extra-allocation carrier resource configuration.

27. The apparatus of claim 26, wherein the at least one processor is configured to cause the apparatus to:
    configure a power threshold (T) of the one or more power thresholds to comprise one or more of a power limit for each extra-allocation PRT of the one or more extra-allocation PRTs, a power limit for total power in each sub-band of the extra-allocation carrier resources, or a power limit defined as a sum total of power in the extra-allocation carrier resources.

28. The apparatus of claim 26, wherein a value of the one or more power thresholds is based on at least one of network loading with respect to a network providing the wireless communications, the extra-allocation carrier resources being disposed in one or more sub-bands of bandwidth available for allocation of carrier resources for the data transmission, an amount of interference, communication link path loss, or an operating parameter of a UE of the plurality of UEs.

* * * * *